May 16, 1967  L. L. BAIRD  3,320,390
CONTACT PRESSURE CLAMP FOR AN ELECTRIC SWITCH
Filed Jan. 21, 1965  5 Sheets-Sheet 3
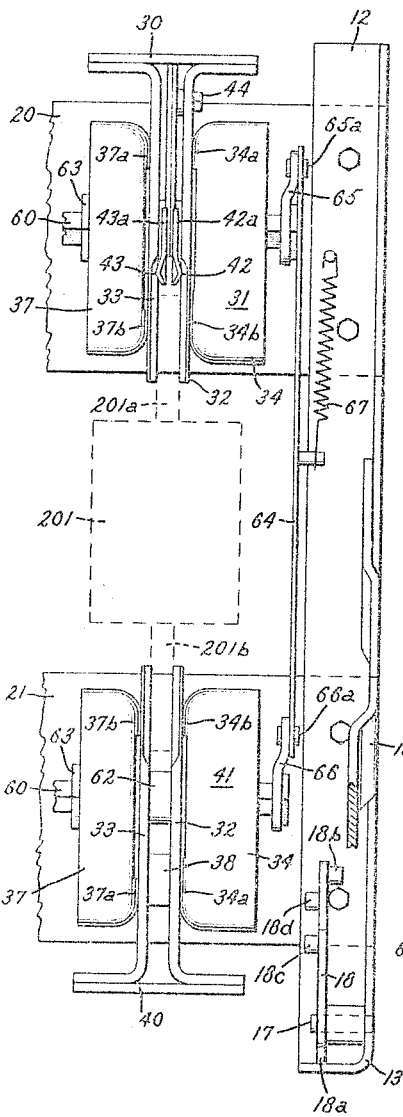
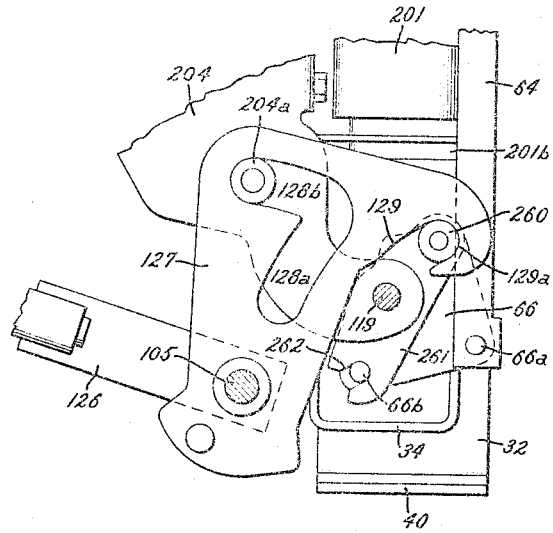
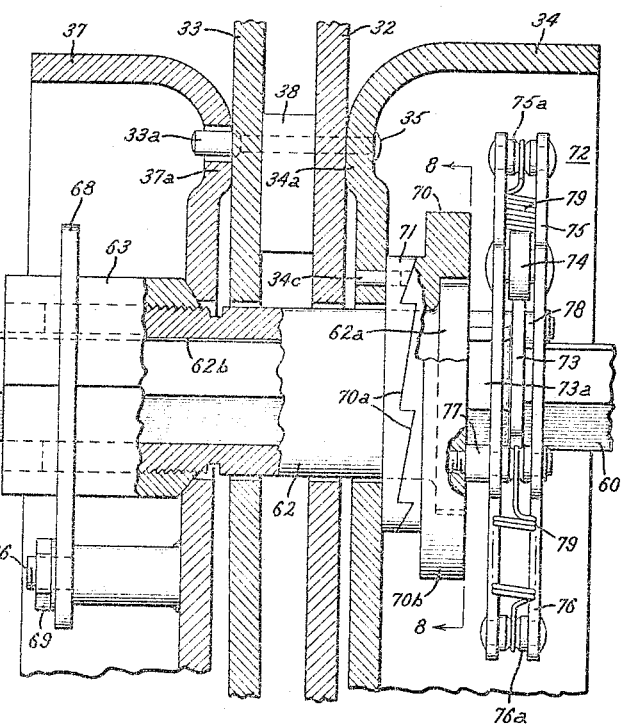
INVENTOR:
LESLIE L. BAIRD,
BY Albert S. Richardson Jr.
ATTORNEY

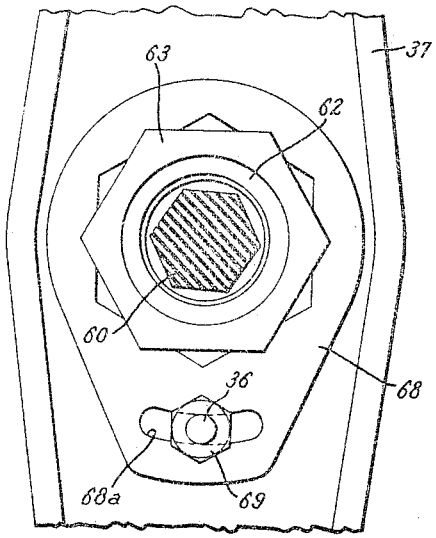
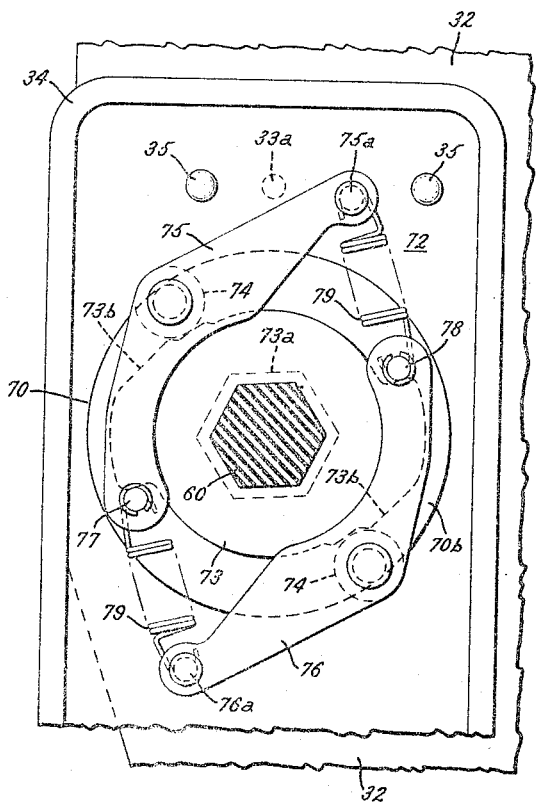
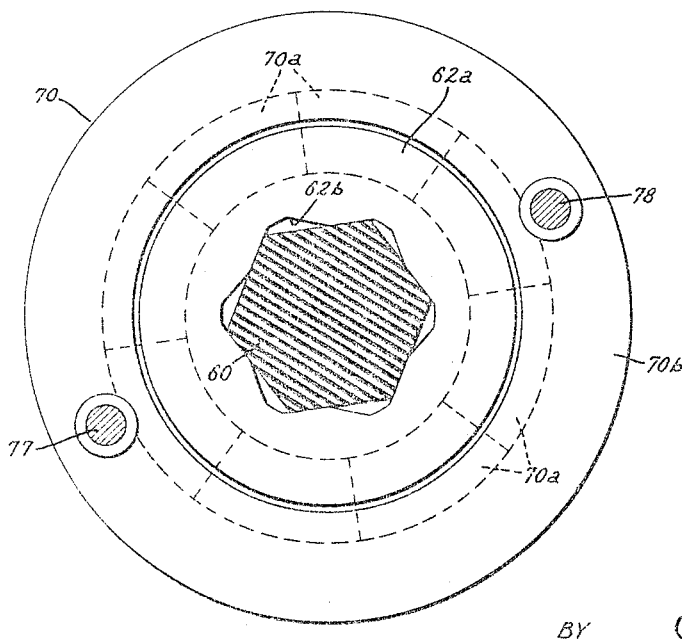

United States Patent Office 3,320,390
Patented May 16, 1967

3,320,390
CONTACT PRESSURE CLAMP FOR AN ELECTRIC SWITCH
Leslie L. Baird, Swarthmore, Pa., assignor to General Electric Company, a corporation of New York
Filed Jan. 21, 1965, Ser. No. 427,061
10 Claims. (Cl. 200—166)

This invention relates to electric switches, and, more particularly, it relates to means for obtaining high contact pressure in a switch designed to conduct relatively high current (e.g., 1,200 amperes).

The present invention has special utility in high current, 600-volt service entrance applications where multipole fused switches with bolted-pressure contacts are commonly used to switch and to protect A.-C. electric power circuits and loads fed from service entrance conductors. In practice such devices are equipped with low-cost manually or electrically operated mechanisms for opening the main switch contacts when desired, thereby breaking the circuit in which the device is connected and interrupting whatever load current may then be flowing. Overload and fault protection is automatically provided by the electric fuses which are designed to "blow" under overcurrent conditions with a time delay inversely related to overcurrent magnitude. By using Class L (NEMA standards designation) low-voltage current-limiting cartridge fuses, current as high as 200,000 amperes can be quickly and safely interrupted in the event that a very severe fault or short circuit occurs.

In pressure switches of conventional design, an electro-conductive blade is freely moved by the switch operating mechanism into a closed circuit position with respect to a pair of spaced-apart relatively stationary contacts, and the interconnected blade and contacts are then tightly clamped together to ensure high-pressure, low-resistance electrical junctions therebetween.

In the fusible switch part it has heretofore been proposed to mount removable cartridge fuses in place of the movable switch blades. For the sake of current-carrying efficiency, the fuse terminals should make high-pressure contact directly with the cooperating stationary contacts of the switch. But a successful marriage of such a fused switch construction and the aforesaid pressure switch design for high-current service entrance applications and the like presents certain problems that are unsolved by any teachings in the prior art I am presently aware of.

Some of the problems referred to can be attributed to the fact that the thickness of the terminals of commercially available cartridge fuses can vary slightly from one fuse to another; for example, a terminal norminally .375 inch thick may actually be as much as .031 inch oversized or undersized. Consequently, whenever a blown fuse is replaced there is a real possibility that the terminals of the new fuse will be thinner (or thicker) than the terminals of the fuse being replaced. As a result, the amount of contact pressure obtained by conventional pressure switch techniques is subject to adverse variation. This problem is particularly acute in a multi-pole switch employing a plurality of cartridge fuses, since the terminals of any one of the fuses might be either thicker or thinner than those of the fuse adjacent to it.

Accordingly, a general object of the present invention is the provision of an improved contact pressure clamp for fusible switches.

Another object of my invention is to provide means for obtaining consistent, high contact pressure in a pressure switch designed to accommodate a variety of movable blade-like contacts of different thicknesses.

Yet another object of the invention is the provision, for use in a multipole switch having bolted-pressure contacts, of improved means for ensuring uniform contact pressure at the respective contacts of the switch.

It is also an object of this invention to provide relatively simple and inexpensive means for clamping a blade-like contact between a pair of jaw-like contacts with a predetermined substantially constant amount of pressure regardless of expectable tolerance or fatigue of the contacts.

In carrying out my invention in one form, a blade-like fuse terminal is inserted between two jaw-like contacts which in turn are sandwiched between a nut and the head of a mating bolt. In order to exert pressure on the interposed contacts and fuse terminal, the bolt is screwed into the nut by turning a rotatable actuating member. This member, which has a predetermined initial angular position, is connected to the bolt by lost-motion means so that the bolted-pressure action on the contacts does not begin until the actuating member rotates beyond a second angular position spaced from its first position by a predetermined angle. An expandable spacer is located between the bolt head and the adjacent contact, and means responsive to rotation of the actuating member through said predetermined angle is provided for expanding the spacer until the fuse terminal and the contacts are subjected to a preset amount of compression. This preset compression will consistently be obtained even though the terminal thickness of one fuse is not precisely the same as that of another and even though the jaw-like contacts in time become fatigued. Since the contacts are always subject to said preset compression when the bolted-pressure action begins, any desired constant amount of pressure can be finally applied to the contacts upon rotating the aforesaid actuating member an appropriate amount beyond its second position.

My invention will be better understood and its various objects and advantages will be more fully appreciated from the following description taken in conjunction with the accompanying drawings in which:

FIG. 3 is a partial front elevation of the switch shown in FIG. 2 after the front frame and its associated parts as well as the arc-quenching means have been removed;

FIG. 5 is a partial side view of the switch after its contact-pressure-applying means has been actuated;

FIG. 6 is an enlarged sectional view, taken through lines 6—6 of FIG. 2, of my contact clamping means in its preferred form;

FIG. 7 is a view of the left side of the contact clamping means shown in FIG. 6;

FIG. 8 is an enlarged sectional view taken through lines 8—8 of FIG. 6; and

FIG. 9 is a view of the right side of the contact clamping means shown in FIG. 6.

Figure 1:
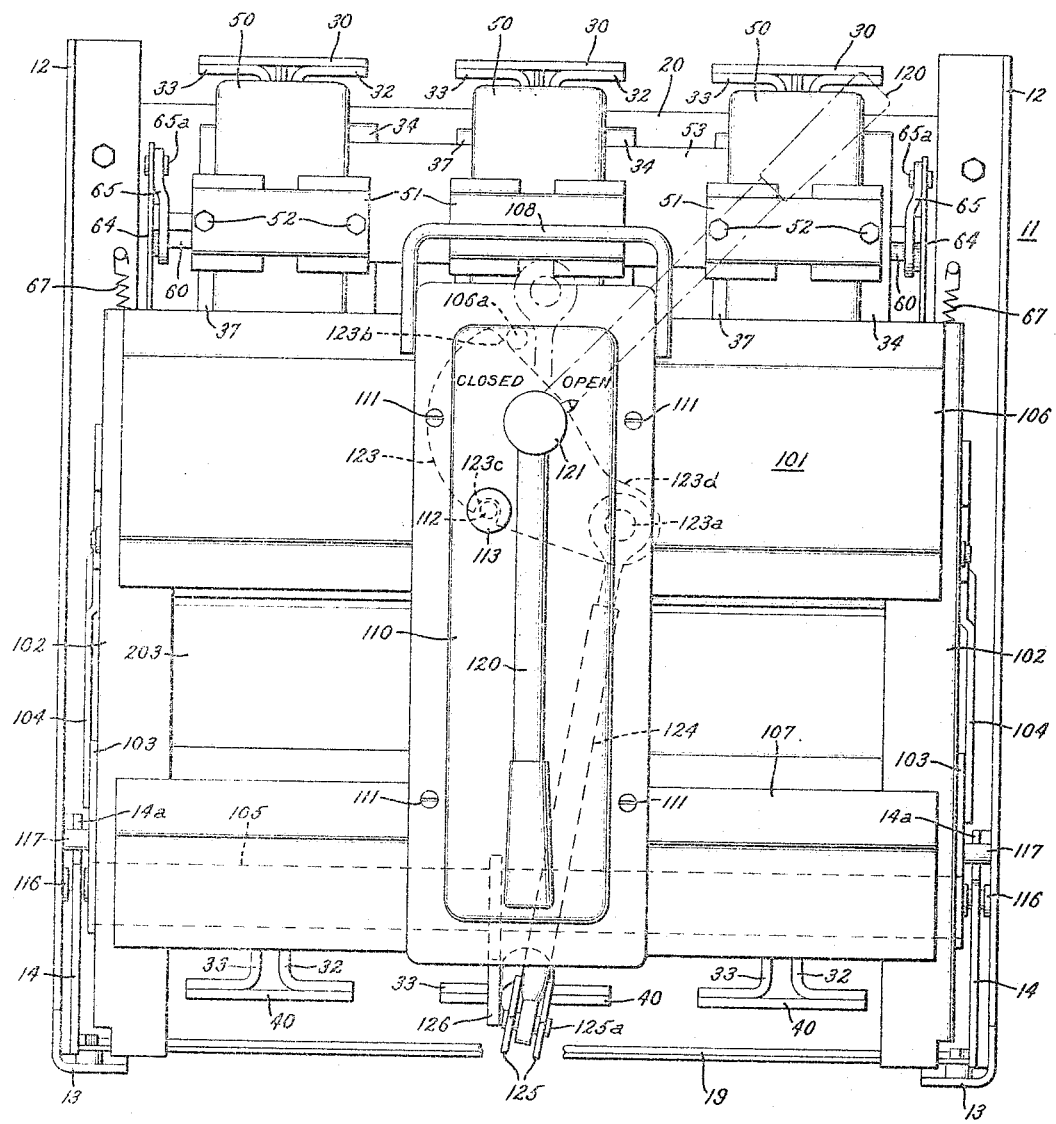
FIG. 1 is a front elevation of a 3-pole electric switch embodying the contact pressure applying means of my invention.
Figure 2:
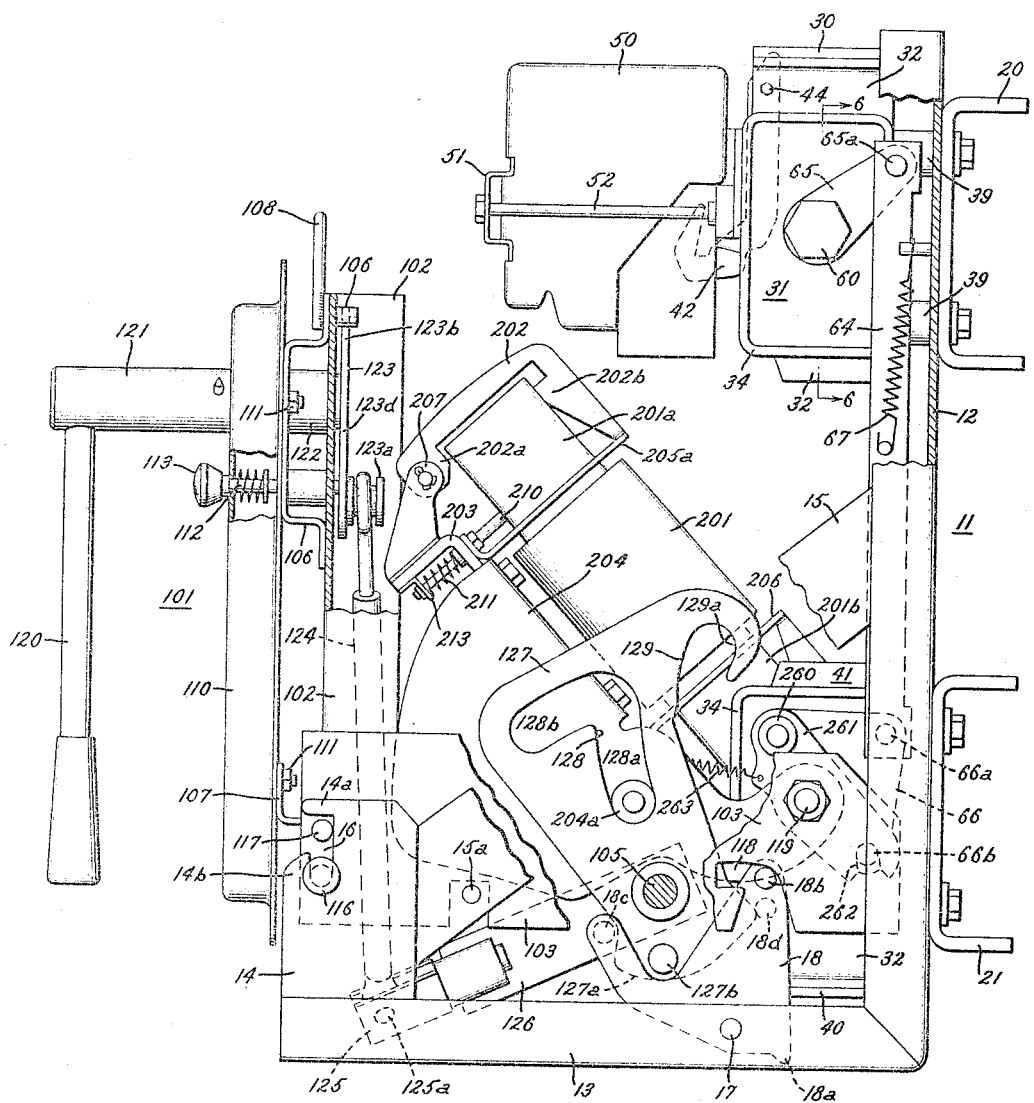
FIG. 2 is a side elevation of the FIG. 1 switch in an open circuit condition, with portions of the front and the back frames of the switch broken away to more clearly show its interior parts.

Referring to FIGS. 1 and 2, the illustrated switch will be seen to include a stationary unit 11, three pairs of spaced-apart incoming and outgoing electric current conductors 30 and 40 fixedly supported by the unit 11 in side-by-side relation to each other, and a carriage 101 adapted to support means for closing and opening a circuit between the separate conductors forming each pair 30, 40. The carriage 101 also contains a mechanism for conjointly actuating all three of the circuit closing and opening means, and this mechanism includes a manual operating handle 120 that is accessible from the front side of the carriage escutcheon 110. The handle 120 is pivotally movable between a vertical, switch "open" position shown in solid lines in FIG. 1 and a raised, switch "closed" position shown in broken lines.

The entire switch assembly is adapted to be mounted in any suitable enclosure having an openable front cover for access, with the unit 11 being bolted or otherwise secured to the escutcheon and the escutcheon 110 and the handle 120 protruding through a conforming aperture provided in the cover. The operating handle 120 in its raised position would prevent opening of the cover, thereby blocking access to the interior of the enclosure so long as the switch is closed.

The construction of the stationary unit 11 of the switch will now be described. This unit includes a back frame having generally L-shaped metal side structures that are rigidly fastened together by a plurality of cross pieces. As is best seen in FIG. 2, each of the side structures comprises an angle disposed vertically to form a rear corner post 12 and bent horizontally to form a side member 13 extending frontwardly from the lower end of the post 12. At the front end of the member 13 a relatively short upstanding plate 14 is affixed, and this plate is additionally fastened to the midsection of the post 12 by means of a diagonal brace 15. A notch 16, bounded by a horizontal upper lip 14a and a vertical lower lip 14b, is provided in the front side of the plate 14 for removably receiving and holding a support pin 116 of the carriage 101.

At a point 17 on the rear section of the side member 13 there is pivotally mounted an upstanding support and locking member 18. This member is spring biased to a position in which a corner 18a thereof bottoms on the horizontal flange of the side member 13 and in which an anchor pin 18b carried by the member 18 is disposed directly above the corner 18a as shown. The side member 13 is joined to the corresponding member on the far side of the stationary unit by a bar 19 that extends across the bottom of the unit, and the two corner posts 12 are spanned at different elevations by two horizontal channels 20 and 21 that are tightly bolted to the backsides thereof. The channels 20 and 21 are made of rigid, electrical insulating material.

The stationary unit 11 also includes a plurality of separate pairs of spaced-apart relatively stationary electric contacts 31 and 41, which pairs are mounted in side-by-side relation to each other on the insulating channels 20 and 21 of the frame described above. A front view of one pair of contacts is shown in FIG. 3 (and the other pairs are essentially the same). It will there be seen that the contacts 31 and 41 are of jaw-like design, that is, each one comprises a pair of electrically interconnected, physically spaced electroconductive elements or contacts 32 and 33 arranged to grip opposite sides of a movable blade-like contact inserted in the gap therebetween. The contacts 32 and 33 preferably comprise deflectable silver plated copper bars having their flat sides in parallel vertical planes that are perpendicular to the channels 21 and 22 and having their forward edges beveled to guide the cooperating blade on its insertion therein.

Adjoining the outer side of the bar 32 of the lower stationary contact 41 is a dished member 34 that is rigidly fastened to the associated channel 21. The bar 32 is affixed to this member by a pair of rivets. A depending portion of the bar 32 is connected to and supports the aforesaid conductor 40 in a convenient disposition for connection to an external electric power circuit, and a similar portion of the companion bar 33 is also attached to the conductor 40. The bars 32 and 33 extend vertically from the conductor 40 in spaced parallel relation to each other, and another dished member 37 is located on the outer side of bar 33 opposite the member 34 as shown. At one point between the bars 32 and 33 a suitable spacer 38 is disposed for the purpose of maintaining between the inner sides of the bars at this point a predetermined minimum gap whose length is approximately the same as the thickness of the blade to be inserted.

In order to ensure a tight yet separable connection between the bars 32 and 33 and the blade that is inserted therebetween, the improved pressure applying clamping means of my invention is provided. As shown in the drawings this clamping means includes a common rotatable drive shaft 60 extending horizontally through aligned apertures in the respective bars 32, 33 and members 34, 37 that comprise each of the lower contacts 41. The shaft 60 is insulated so that the separate contacts 41 will remain electrically isolated from each other, and it is surrounded at each of these contacts by a pair of annular members 62 and 63.

The annular member 63 is housed in the dished member 37, and preferably it comprises a non-rotatable nut having an internal screw thread. The other member 62 preferably comprises an externally threaded tubular bolt that can be rotated with respect to the nut 63 by a predetermined rotation of the shaft 60. The bolt head is located in the dished member 34, and the bolt extends along the shaft 60 into the member 37 where it mates with the nut 63. Thus the head of the bolt 62 and the nut 63 respectively bear against opposite sides of the stationary jaw-like contacts, and the cooperating blade-like contact can be tightly clamped between the bars 32 and 33 by rotating the shaft 60 so as to turn the bolt into the nut. Further details of this bolted pressure arrangement are explained hereinafter in connection with the description of FIGS. 6–9.

The construction of each upper contact 31 of the stationary unit 11 is similar to that described above for the lower contact 41. However, the spaced bars 32 and 33 forming each of the jaw-like contacts 31 extend upwardly instead of downwardly from the associated members 34 and 37 to the attached conductor 30, with each member 34 being rigidly fastened (by the means shown at 39 in FIG. 2) to the upper insulating channel 20 instead of to the lower one.

It is now apparent that by electrically interconnecting the paired contacts 31 and 41, a closed electric circuit will be formed between corresponding upper and lower conductors 30 and 40, and for this purpose a bridge-like electroconductive element 201 having blade-like main contacts 201a and 201b at opposite ends thereof is provided. The element 201, which is shown in phantom in FIG. 3, is supported in a manner hereinafter fully described by a movable switch member on the aforesaid carriage 101. When its contacts 201a and 201b are inserted between the jaw-like contacts 32–33 of 31 and 41, the element 201 completes a main current path between conductors 30 and 40. High-pressure, low-resistance connections between these cooperating main contacts is then obtained by actuating the above described clamping means.

The common drive shaft 60 of the clamping means associated with the respective upper contacts 31 and the corresponding drive shaft 60 below have been interconnected for joint rotation by a pair of tie bars 64. The upper ends of the tie bars 64 are pivotally attached at 65a to a pair of cranks 65 that are respectively keyed to opposite ends of the upper shaft; the lower ends of these bars are pivotally attached at 66a to a pair of cranks 66 keyed to opposite ends of the lower shaft. Both of the shafts 60 are biased in a pressure relieving direction (counterclockwise as viewed in FIG. 2) by means of a pair of springs 67 each of which is connected in tension between one of the tie bars 64 and the adjacent corner post 12 of the stationary unit so as to urge the bar upwardly. Both shafts are simultaneously rotated in the opposite, pressure-applying direction by actuating means located on the carriage 101, soon to be described.

Each of the upper relatively stationary contacts 31 also includes a pair of jaw-like arcing contacts 42 and 43. These arcing contacts comprise elongated, relatively thin metal members disposed between the bars 32 and 33 adjacent to the main contact area thereof. The upper ends of the members 42 and 43 are physically and electrically connected to the stationary bar 32 by a bolt 44 or other suitable means. The lower portions of the members 42 and 43 are bent to protrude in front of the bar 32 (best seen in FIG. 4), where they form a relatively short gap in alignment with the gap between the bars 32 and 33 (best seen in FIG. 3). The tips 42a and 43a of the protruding portions of these members are turned up to form arc runners.

The protruding portions of each pair of relatively stationary arcing contacts 42 and 43 are arranged to be separably engaged by a blade-like arcing contact 202 that is mounted on the movable switch member of the carriage 101 in association with the main contact 201a of each of the bridge-like elements 201. When the element 201 is in a closed circuit position (FIG. 4), its arcing contact 202 is disposed between the cooperating arcing contacts 42 and 43 which yieldably grip opposite sides of the contact 202 to maintain a good electrical connection therewith. During movement of the element 201 toward an open circuit position, the arcing contacts 202 and 42, 43 will not separate until after the main contacts 201a and 32, 33 are disengaged, whereupon an electric arc may be drawn between the arcing contacts. Any such arc will be contained and extinguished within an electric arc chute 50 that embraces the protruding portions of each pair of the stationary arcing contacts 42 and 43.

As is seen in FIGS. 1 and 2, a clamp 51 and a pair of long bolts 52 are used for removably securing a separate arc chute 50 to the stationary unit 11 in association with each of the contacts 31. The bolts 52 are anchored in a horizontally-extending strip 53 of insulating material that in turn is rigidly fastened to the front sides of the respective members 34 of the stationary contacts 31. Since neither the presence of the arc chutes 50, their design particulars, nor the method of mounting the chutes on the stationary unit 11 are material to the present invention, a detailed description of these parts will be omitted.

The construction of the carriage 101 of the switch will now be described. It comprises a metal front frame having generally L-shape side structures that are rigidly fastened together by a plurality of cross pieces. Each of the side structures of this frame comprises an angle forming a vertical front corner post 102, a side plate 103 affixed to the post 102 near its lower end and extending rearwardly therefrom, and a diagonal brace 104 interconnecting the rear end of plate 103 and the upper end of post 102. A shaft 105 extends horizontally across the bottom of the carriage and is journalled at its opposite ends to the respective side plates 103, and two rigid cross members 106 and 107 span the corner posts 102 to complete the frame. The escutcheon 110 is bolted at 111 to the cross members 106 and 107 of the front frame as shown. This frame, in combination with a switch member 203 that is movably supported thereby and a mechanism for moving the same, comprises a portable unit that is separably hinged to the stationary unit 11 for angular movement between two different positions.

Figure 4:
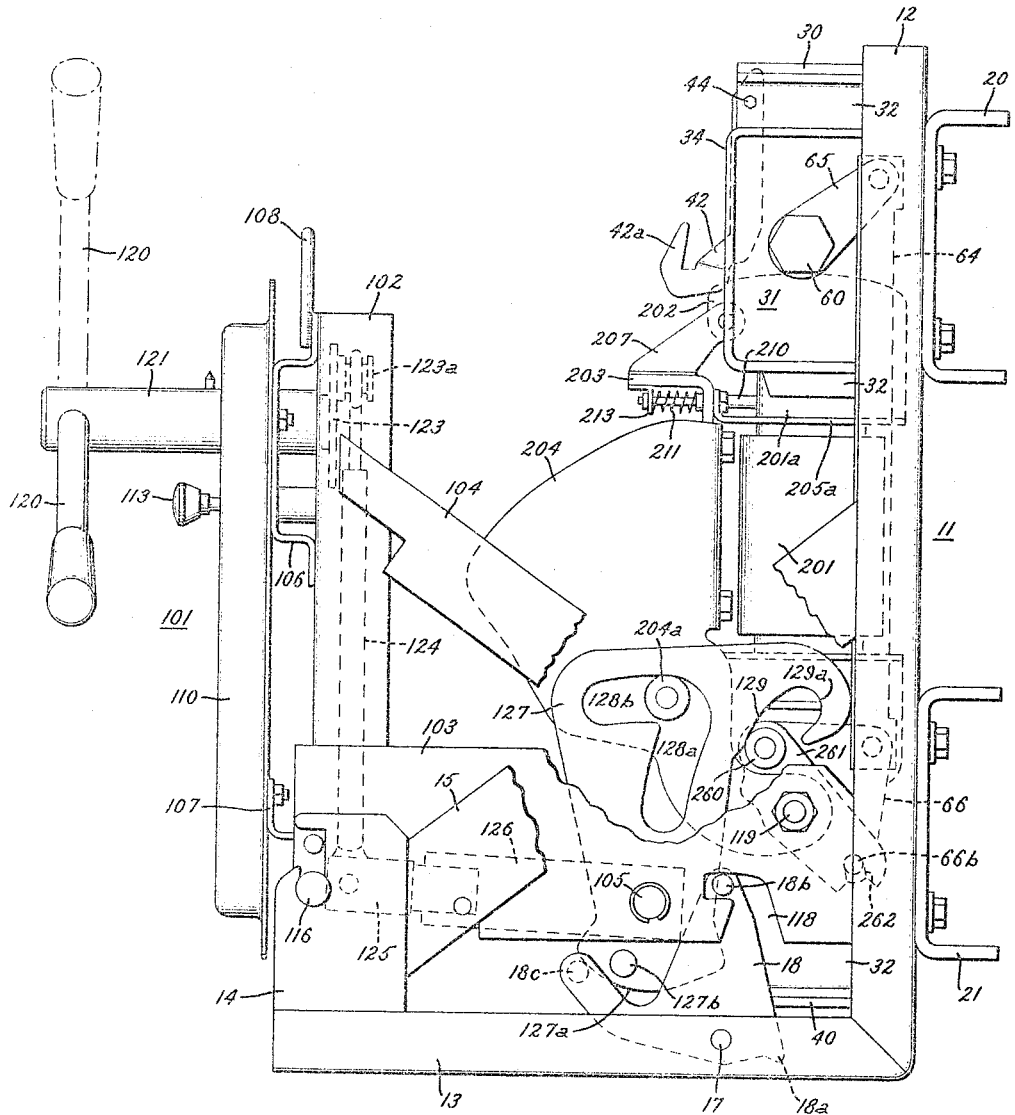
FIG. 4 is a side elevation similar to FIG. 2 but with the movable switch member shown in its closed position.

For the purpose of separably hinging the portable unit on the stationary unit, a coaxial pair of laterally projecting support pins 116 are respectively located on the opposite side plates 103 of the carriage 101 in the vicinity of the front side thereof. These pins fit into the aforesaid notches 16 in the upstanding plates 14 of the stationary frame, and the carriage 101 can pivot or swing about the common axis of these pins to and away from a predetermined first or "operating" position in which it is shown in FIGS. 1, 2, and 4. This position is determined by the anchor pin 18b abutting the top edge of a slot 118 formed in the bottom of each side plate 103 of the carriage as shown. So long as the carriage 101 is in the operating position, the upper lip 14a of each notch 16 overhangs another pin 117 located next to each support pin 116 (see FIGS. 1 and 2) to prevent lifting the portable unit vertically with respect to the stationary unit 11.

From its first position the portable unit can be pivoted on its support pins 116 through an angle of about 75 or 80 degrees to a second or tilted position which is determined by an appendage on each of the corner posts 102 abutting the under side of a stop pin 15a that is affixed to each of the diagonal braces 15 of the stationary unit. From its tilted position the portable unit can be separated from the stationary unit for installation and servicing convenience by manually lifting it so that the pins 116 leave the notches 16, for which purpose a C-shaped carrying handle 108 is prominently located on the upper cross member 106 of the carriage 101.

The portable unit includes the switch member 203 which is adapted to support the aforesaid bridge-like electroconductive elements 201. The switch member 203 is pivotally mounted on the side plates 103 of the carriage 101 for reciprocal movement relative thereto between predetermined "closed" and "open" positions. The switch member is a channel of rigid insulating material extending horizontally across the carriage between a pair of attached metal brackets or legs 204 that are supported by a coaxial pair of pivot pins 119 projecting laterally from the respective side plates 103 in the vicinity of the back side of the carriage. With the portable unit in its aforesaid first position, the pivot pins 119 are about coaxial with the lower rotatable shaft 60 of the previously described contact clamping means. The axes of the pivot pins 119, the support pins 116, and the shaft 105 are all oriented parallel to each other.

The electroconductive element 201 supported by the switch member 203 is shown in FIG. 2 as a cartridge fuse having vertically oriented blade-like terminals that comprise the aforesaid main contacts 201a and 201b, respectively. Three separate fuses are removably supported by the switch member in side-by-side electrically insulated relation to each other, each fuse being located adjacent to the back side of the carriage with its terminals aligned with a corresponding pair of relatively stationary jaw-like contacts 31 and 41. Toward this end the member 203 is provided with a plurality of spaced-apart pairs of fuse holders 205 and 206 arranged to hold opposite terminals 201a and 201b of the respective fuses 201.

Each of the lower fuse terminal holders 206 is in the form of a generally rectangular collar projecting rearwardly from the bottom of the switch member 203, to which it is affixed, and a relatively thin U-shape bracket subtending the collar. The blade-like fuse terminal 201b is loosely embraced by the collar, which restricts lateral movement of the blade, and it is supported by the interior surfaces of the bracket which limit edgewise movement thereof. The bracket is made thinner than the blade 201b so as to avoid interfering with the direct electrical connection between the blade and the jaw-like contact 41.

Each of the upper fuse terminal holders 205 is in the form of an inverted L-shape metal member that comprises the aforesaid arcing contact 202. This contact has one end 202a pivotally attached to an upright bracket 207 that is affixed to the top of the switch member 203, and its other end is integrally connected to a pair of parallel, spaced-apart arms 205a whose free ends are releasably bolted to the switch member 203. The arms 205a loosely embrace the blade-like fuse terminal 201a and hence restrict lateral movement of the blade. The side of contact 202 adjoining the arms 205a is adapted to abut the leading edge of the blade 201a as shown, and contact pressure is there maintained by a spring-loaded plunger 210 that urges the blade away from the switch member 203. The arcing contact 202 is made thinner than the blade 201a so as to avoid interfering with a direct electrical connection between the blade and the main jaw-like contact 31.

By unfastening the arms 205a from the switch member 203, the upper fuse terminal holder 205 can be pivoted about 202a to a position wherein the arcing contact 202 is disengaged from the blade 201a, whereby the fuse 201 is released from the switch member for removal and replacement purposes. This operation is most conveniently accomplished while the carriage 101 is in its tilted position described hereinbefore.

The switch member 203 of the portable unit is moved between its open and closed positions by an operating mechanism that will next be described. The operating mechanism in its preferred form includes the manual operating handle 120. As can be seen in FIGS. 1 and 2, handle 120 depends radially from the front end of a short horizontal shaft 121 to which it is affixed. The shaft 121 extends through the escutcheon 110 and is journaled near its rear end in a bearing 122 that is centrally supported by the upper cross member 106 of the carriage 101. A plate-like crank 123 is keyed to the rear end of the shaft 121.

The plate 123 is drivingly connected to the rotatable shaft 105 of the switch operating mechanism by means of a tie rod 124. A pin 123a protruding rearwardly from the plate 123 is loosely embraced by an eyelet formed at the upper end of the tie rod 124. The lower end of this rod is pivotally attached to a pin 125a spanning a yoke 125 that is pivotally supported at the distal end of an arm 126 projecting radially from a central portion of the shaft 105 to which it is rigidly anchored, whereby a universal joint is formed between the tie rod 124 and the arm 126. With this arrangement, the shaft 105 is rotated approximately 45 degrees in a clockwise direction (as viewed from the right side of the switch) in response to the operating handle 120 being pivoted counterclockwise (front view) about the axis of the shaft 121 from its vertical position shown in FIGS. 1 and 2 through an angle of approximately 135 degrees to its fully raised position. If desired, the shaft 105 could alternatively be driven by other suitable means, such as a stored energy spring-actuated mechanism.

It is desirable to releasably lock the manual operating handle 120 in each of its vertical and raised positions, for which purpose a spring loaded plunger 112 is mounted on the upper cross member 106 behind the escutcheon 110. Whenever the handle is in its vertical ("open") position, which position is defined by a first shoulder 123b of the plate 123 engaging a boss 106a on the cross member 106, the plunger 112 is spring-biased rearwardly into a cooperating notch 123c provided in the edge of plate 123, whereby counterclockwise movement of the plate is blocked until the plunger is withdrawn by pulling a knob 113 that is attached thereto. The knob 113 is accessible from the front side of the escutcheon 110. When the knob is pulled and counterclockwise movement of the operating handle 120 is begun, the front surface of the plate 123 slides across the end of the plunger 112. As the handle reaches its fully raised ("closed") position, which position is defined by an opposing shoulder 123d of the plate 123 engaging the same boss 106a, the first shoulder 123b will move just beyond the plunger 112 which is then free to move rearwardly into a blocking position therewith, whereby reverse movement of the handle 120 in a clockwise direction is physically prevented until plate 123 is again released by manually pulling the knob 113.

The driven shaft 105, as was mentioned hereinbefore, extends horizontally across the carriage 101 and is journaled at its opposite ends to the respective side plates 103. A pair of cam members 127 are keyed to the shaft 105 near its respective ends. The preferred configuration of each cam member 127 is best seen in FIG. 2. Each is provided with a cam slot 128 having a generally vertical section 128a that intersects and extends downwardly from the rear end of a generally horizontal section 128b. A roller 204a is disposed in the cam slot 128. The roller 204a is mounted on the supporting leg 204 of the movable switch member 203, and it traverses the cam slot 128 during closing and opening operations of the switch operating mechanism.

The action of the mechanism during a closing operation will now be considered.

The switch closing operation is accomplished in two distinct steps. The first step is carried out by relasing and angularly moving the manual operating handle 120 through about one-half of its 135-degree counterclockwise closing stroke. This will cause the arm 126 on the shaft 105 to move through approximately three-fifths of its 45-degree throw, thereby rotating the shaft 105 and its cam members 127 a corresponding amount. During this step the front edge of the first section 128a of the cam slot 128 moves rearwardly and cams the roller 204a upwardly with respect thereto. As a result, the rollers 204a, the legs 204, and hence the switch member 203 are driven clockwise on the pivot pins 119 along an approximately 42-degree arcuate course from the initial open position shown in FIG. 2 to the closed position in which these parts are shown in FIG. 4. This clockwise movement of the switch member 203 carries the blade-like upper terminals 201a of the respective cartridge fuses 201 into wiping engagement with the associated jaw-like stationary contacts 31.

For the remainder of the closing operation, the roller 204a will be in the second cam slot section 128b whose bottom edge closely conforms to the arc of a circle concentric with the shaft 105, whereby the movable switch member 203 is held in its closed position but no further clockwise angular motion is imparted thereto.

With the fuse-carrying switch member 203 in its closed position, and with the carriage 101 fixed in its operating position shown in FIG. 4, the terminals at the opposite ends of each cartridge fuse 201 directly engage both of the main stationary contacts 31 and 41 that are associated therewith, thereby making or completing a fused electric circuit between corresponding upper and lower conductors 30 and 40. For the purpose of positively anchoring the portable carriage 101 in its aforesaid disposition to the stationary unit 11 while the switch is being closed, each cam member 127 has been provided with a lobe 127a whose leading edge engages a roller 18c mounted on the adjacent support and locking member 18 so as to tilt this member counterclockwise upon initial clockwise rotation of the cam member 127. When so tilted, the anchor pin 18b carried by the member 18 shifts frontwardly from the mouth to an interior portion of the notch 118 that is formed in the bottom edge of the side plate 103 of the carriage 101. The carriage 101 is then locked to the stationary unit 11, and it cannot be moved relative thereto until the side plate 103 is subsequently released by egress of the pin 18b from the notch 118 when the cam member 127 returns to its original position. This prevents the hazardous possibility of opening the switch contacts by tilting the carriage.

The second step of the switch closing operation is used to actuate the above-described contact clamping means so as to apply high contact pressure on the then interengaging main contacts of the switch. This step is carried out by continuing to move the manual operating handle 120 through the remainder of its counterclockwise closing stroke to its fully raised position, thereby causing the shaft 105 and its cam members 127 to turn clockwise from the position shown in FIG. 4 to the position shown in FIG. 5. If desired, spring means (not shown) could be coupled to the handle 120 so as to assist the operator in moving the handle during this part of its closing stroke.

With the cam member 127 in its FIG. 4 position, a camming surface 129 on the rear edge thereof engages a roller 260 mounted at one end of a coupling lever 261 whose opposite end 262 is slotted. The axle of the roller 260 protrudes a short distance in the direction of the lower stationary contact 41 which is adjacent thereto. At a point midway between the roller 260 and the slot 262, the lever 261 is journaled on the pivot pin 119 which projects laterally from the side plate 103 of the carriage 101. A tension spring 263 (see FIG. 2) biases this lever in a counterclockwise sense to a normal position determined by a boss on the lever engaging the side plate 103.

With the lever 261 in its normal position and with the carriage 101 anchored in the fixed disposition shown in FIG. 4, the slot 262 will register with a pin 66b protruding from the crank 66 that is keyed to the adjacent end of the lower rotatable shaft 60 as previously described. (The lower shaft 60 is coaxial with the pivot pin 119.) The crank 66 is also provided with a slot diametrically opposite the pin 66b, which slot registers with the protruding axle of the roller 260. Thus the crank 66 is coupled to the lever 261 for joint rotation therewith. The same coupling is provided at the far side of the switch.

As the second step of the switch closing operation is carried out, the camming edge 129 of the member 127 advances in such a manner as to drive the roller 260 and hence the lever 261 clockwise about the pivot pin 119 through an angle of approximately 45 degrees to the position in which these parts are shown in FIG. 5. The crank 66, being coupled to the lever 261, is correspondingly rotated with respect to the axis of the lower shaft 60, and the interconnected upper crank 65 is rotated conjointly therewith. As a result, each of the upper and lower drive shafts 60 of the contact clamping means is turned clockwise about its axis from the initial angular position in which it is shown in FIGS. 2–4 to a predetermined final angular position (FIG. 5) spaced from the initial position by approximately 45 degrees. During the course of this turning each tubular bolt 62 is screwed into the associated nut 63, thereby reducing the spacing between the bolt head and the nut and compressing the interposed contact members 32, 33 and 201a (or 201b). This contact clamping action will soon be more fully explained.

The second step of the switch closing operation is completed when the manual operating handle 120 reaches its fully raised position (shown in broken lines in FIGS. 1 and 4) where it is retained by the releasable locking means 112, 113 previously described. Brief consideration will now be given to a switch opening operation, which is essentially the reverse of the closing operation just described.

The switch opening operation is begun by releasing the operating handle 120 and angularly moving it in a clockwise direction (front view), thereby causing counterclockwise rotation (as viewed in FIG. 5) of the shaft 105 and its cam members 127. The illustrated cam member 127 is provided with a hook-like part opposing the camming edge 129, and a camming edge 129a on this part pulls the roller 260 and hence the lever 261 and the crank 66 in a counterclockwise direction from their FIG. 5 position. This action, which is aided by the springs 67 and 263, simultaneously turns both of the drive shafts 60 of the contact clamping means in a counterclockwise, pressure relieving direction. As the rear end of the second cam slot section 128b in the member 127 approaches the roller 204a, the coupling lever 261 returns to its normal position shown in FIG. 4 and each drive shaft 60 is returned to its initial angular position, whereby the bolted-pressure connections between stationary contacts 31, 41 and fuse terminals 201a, 201b are loosened before the movable switch member 203 is moved away from its closed position.

Continued counterclockwise rotation of the cam member 127 after the rear edge of its first cam slot section 128a makes contact with the roller 204a will cam the roller downwardly with respect thereto. As a result, the switch member 203 and supporting legs 204 are moved counterclockwise on the pivot pins 119 along their predetermined arcuate course from closed to open positions. This reverse movement of the switch member 203 effects separation of the upper fuse terminal 201a and its associated arcing contact 202 from the stationary contact 31, and consequently the electric circuit between the corresponding upper and lower conductors 30 and 40 is opened.

The switch opening operation is completed when the manual operating handle 120 reaches a vertical position (FIG. 2) where it is again retained by the releasable locking means 112, 113.

As the movable switch member 203 is returning to its open position near the end of the switch-opening operation, the lobe 127a on the cam member 127 moves beyond the roller 18c on the support and locking member 18, and the rear edge of the lobe will engage and move a laterally-protruding pin 18d on the member 18. This tilts the whole member 18 clockwise to a position in which the anchor pin 18b registers with the mouth of the notch 118 in the side plate 103 of the carriage 101, thereby disabling the anchoring means and releasing the carriage 101 for angular movement on its support pins 116 from the operating position shown in FIG. 2 to the tilted position mentioned hereinbefore.

With reference now to FIGS. 6–9, the preferred embodiment of the improved contact pressure clamping means of my invention will be described in detail. In FIG. 6 the above-mentioned tubular bolt 62 and mating nut 63 are clearly shown, as in the coaxial drive shaft 60. The bolt 62 surrounds the shaft 60 where it passes through aligned holes in the opposing dished members 34 and 37 and associated flat bars 32 and 33 of the illustrated jaw-like contact 31 of the switch. The threaded end of the bolt 62 is disposed in the threaded part of the nut 63.

The portion of the nut 63 located adjacent to the outer side of the bar 33 has a spherically convex shape, and this portion is disposed in a conforming concave seat that is formed in the member 37 around the perimeter of its bolt-accommodating hole. The nut 63 is locked in any desired angular disposition relative to the member 37 by means of a collar 68 that is fastened to a stud 36 rigidly anchored in the dished member 37. As is best seen in FIG. 7, the collar 68 has a multi-sided hole in which the hexagonal nut 63 is captured in a selected one of twelve equiangularly spaced positions and the stud 36 extends through an opening 68a in the collar that is slotted to permit 30-degree adjustment of this part before being securely fastened to the stud by a nut 69. Thus the pressure clamp nut 63 can be initially screwed onto the tubular bolt 62 any desired amount and then locked against further rotation by installing the collar 68.

Spaced-apart protrusions 37a and 37b are formed on the dished member 37 for engaging the adjacent bar 33 on opposite sides of the axis of the bolt 62 (see FIG. 3). The dished member 34 is similarly provided with opposing protrusions 34a and 34b which engage the companion bar 32. The protrusions 37a and 34a are disposed to bear against the outer sides of the respective bars 33 and 32 above the bolt 62 in the vicinity of the point at which the spacer 38 is located. A pair of long rivets 35 has been used to securely fasten together the bar 33, the spacer 38, the bar 32, and the protrusion 34a of the stationary member 34. A pin 33a protruding laterally from the bar 33 is received in a slightly oversized hole in the protrusion 37a, whereby the member 37 cannot rotate appreciably with respect to the stationary axis of the shaft 60.

The upper blade-like terminal of a cartridge fuse will be inserted between the bars 32 and 33 below the bolt 62 at a point remote from the spacer 38, and the outer sides of the bars are engaged in the vicinity of this point by the opposing protrusions 34b and 37b of the members 34 and 37, respectively. As is best seen in FIG. 6, the head 62a of the bolt 62 is located in the stationary member 34 adjacent to an outer side thereof. By turning the bolt 62 the non-rotatable nut 63 is forced to move axially, whereby the spacing between it and the bolt head 62a is increased or decreased, depending on the direction of bolt rotation. By decreasing the spacing, the dished members 34 and 37 are squeezed together and the fuse terminal is tightly clamped between the spaced bars 32 and 33.

The particular construction that is herein illustrated for the nut 63 and the member 37, and the use of a common drive shaft 60 for driving the respective bolts 62 of the pressure clamps at several adjacent poles of the switch, are describe in greater detail and are clamed in a copending patent application Ser. No. 428,659, now Patent No. 3,288,974, for R. J. Baskerville and assigned to the assignee of this application.

In accordance with the present invention, the interposed fuse terminal and jaw-like contacts are positively subjected to a preset compression before the above-described bolted-pressure action is affected. Consequently, regardless of variable thicknesses of different fuse terminals, a predetermined amount of high contact pressure can consistently be obtained upon predetermined rotation of the bolt 62 through a given angle. The preset compression is accomplished by take-up means such as the expandable spacer that will next be described.

The expandable spacer preferably comprises wedging means 70 located between the bolt head 62a and the dished member 34. As illustrated in FIGS. 6 and 8, the wedging means 70 is in the form of a washer coaxially disposed on the tubular bolt 62 for rotation relative thereto. A surface of the washer 70 perpendicular to its axis is symmetrically divided into eight parts that are correspondingly inclined to form a succession of ramps 70a. This "toothed" surface faces a complementary surface of a juxtaposed coaxial washer 71. The mating ramps 70a of the respective washers are appropriately shaped (as, for example, by conforming each to a 45-degree sector of a spiral ramp) to obtain the maximum possible area contact therebetween at all angular positions of washer 70 relative to washer 71. The washer 71 is seated against the member 34 where it is prevented from rotating by a pin 34c. The ramps 70a have been so arranged that rotation of the washer 70 in a clockwise direction, as viewed from the right side of FIG. 6, causes the washers 70 and 71 to spread apart in the direction of their common axis, which direction is parallel to that of contact compression. This wedges the bolt head 62a outwardly and increases the compression of all objects between it and the nut 63.

For the purpose of moving the washer 70 clockwise from the normal position in which it is shown in FIG. 6, I connect a spring release clutch 72 between the washer flange 70b and an actuating member comprising the drive shaft 60. This clutch is housed in the dished member 34. In its preferred form it is driven by a disc-like cam 73 that is appropriately keyed to the shaft 60. As can be seen in FIGS. 6 and 9, the shaft 60 is hexagonal and the cam 63 has a conforming hexagonal hole through which the shaft slidably extends. An axial extension 73a of the cam 73 spaces the clutch assembly from the bolt head 62a.

The cam 73 has two antipodal lobes 73b whose leading edges engage a pair of rollers 74 that are respectively journaled to the midsections of two tangentially-disposed arms 75 and 76. One end of the arm 75 is pivotally mounted on a post 77 projecting from the washer flange 70b to which the post is affixed, and a corresponding end of the arm 76 is pivotally mounted on a similar post 78 that is affixed to the flange 70b at a point diametrically opposite to the post 77. Each of the arms 75 and 76 actually comprises a pair of spaced-apart parallel members which overlap opposite sides of the cam lobes. The associated roller 74 is disposed between these members, and pins 75a and 76a respectively span their distal ends. As is best seen in FIG. 9, a biasing spring 79 is connected in tension between the pin 75a and the post 78 to urge the arm 75 clockwise about its mounting post 77, and another biasing spring 79 is connected in tension between the pin 76a and the post 77 to urge the arm 76 clockwise about its mounting post 78. In this manner both of the rollers 74 are firmly but yieldably held against the respective edges of the cam lobes 73b.

Upon clockwise rotation of the shaft 60 from its initial angular position depicted in FIG. 9, the cam lobes 73b, acting on the rollers 74 carried by the arms 75 and 76 of the spring clutch 72, will turn the washer 70 in a clockwise direction, thereby axially expanding the washers 70 and 71 and increasing contact compression. This action continues so long as the resulting contact compression is less than a predetermined magnitude. But as soon as washer rotation is resisted by an amount of torque equivalent to a preset compression of the aforesaid magnitude, the springs 79 will begin to yield and the cam lobes 73b will start to ride under the rollers 74 which are thereby spread apart, whereupon the clutch 72 slips and no further clockwise rotation is imparted to the washer 70. The cam lobes 73b are inclined so as to prevent regression of the clutch and the connected washer from their attained angular positions during continued clockwise rotation of the drive shaft 60 to its predetermined final position. In order to ensure that the washer 70 is returned to its normal position whenever the switch is subsequently opened, the trailing edges of the lobes 73b have been designed to abut the respective posts 77 and 78 and drive the washer counterclockwise as the shaft 60 is returned to its initial angular position.

After the spring clutch 72 stops turning in unison with its driving cam 73, increased contact compression will be positively effected by clockwise rotation of the tubular bolt 62 relative to the nut 63. For this purpose the rotatable drive shaft 60 is drivingly connected to the bolt 62. Preferably this connection includes a lost-motion coupling, whereby the shaft does not begin to turn the bolt until it has rotated beyond a certain intermediate angular position spaced from its initial position by a predetermined angle (for example 20 degrees). As illustrated in FIG. 8, this is accomplished by providing the tubular bolt with a modified hexagonal hole 62b through which the hexagonal shaft 60 extends. Consequently, the bolt 62 is not turned until the shaft 60 advances in a clockwise direction from its initial angular position shown in FIGS. 8 and 9 through an angle of about 20 degrees, and it is during this step of the contact clamping operation that the above-described expandable spacer 70 is actuated to take up any slack or clearances in the interposed contacts and to firmly subject them to a preset compression of appreciable magnitude.

The two-step contact pressure applying operation of my invention could alternatively be accomplished with clamping means other than the expandable-spacer and bolted-pressure mechanisms particularly set forth herein. For example, the preliminary take-up action could be obtained by providing appropriate spring clutch means responsive to the initial 20-degree rotation of the shaft 60 for screwing the nut 63 onto the bolt 62 until the desired preset contact compression is exerted, after which the bolt would be turned into the nut to further increase the contact pressure. In another alternative embodiment, appropriate wedging means, such as the toothed washers 70 and 71 themselves, might be used in lieu of the illustrated nut and bolt arrangement.

It will now be apparent that in accordance with my invention the ultimate pressure applying step of the contact clamping operation always begins with the contact subjected to a constant, known amount of compression, regardless of fatigue of the bars 32, 33 or of the members 34, 37, and regardless of the precise thickness of the fuse tang that is inserted therebetween. As a result, a predetermined constant contact pressure of high magnitude can be consistently obained by mechanically turning the bolt 62 into the nut 63 a fixed amount corresponding to the angle traversed by the shaft 60 between its aforesaid intermediate and final positions.

The foregoing arrangement is particularly advantageous in a multiple fused switch, since it assures consistently high contact pressure at all poles of the switch even though the thicknesses of the terminals of the respective fuses do not precisely match each other. Furthermore, by operating the manual switch handle 120 so as to loosen and then retighten my contact clamping means, the original contact pressure can easily be restored in the event that after a period of time one or more of the members 32, 33, 34, or 37 should exhibit some plasticity.

While a preferred form of the present invention has now been shown and described by way of illustration, many modifications will occur to those skilled in the art. The claims which conclude this specification are therefore intended to cover all such modifications as fall within the true spirit and scope of the invention.

What I claim as new and desire to secure by Letters Patent of the United States is:

1. A pressure clamp comprising:
   (a) a pair of clamping members having spaced-apart portions between which at least one object can be compressed and having mating parts respectively provided with internal and external screw threads, one of said parts being rotatable with respect to the other;
   (b) a rotatable drive shaft having a predetermined initial angular position;
   (c) connecting means between said shaft and said one part for turning said one part and thereby changing the spacing between said portions of said clamping members in response to predetermined rotation of said shaft between its initial position and a predetermined final angular position;
   (d) an expandable spacer located between one of said portions and an object to be compressed; and
   (e) means responsive to rotation of said shaft from its initial position toward a predetermined intermediate angular position for expanding said spacer so long as the object is subjected to less than a preset amount of compression.

2. The pressure clamp of claim 1 in which the spacer comprises wedging means movable in a predetermined direction to increase the compression of the object and in which the spacer-expanding-means is operative to move said wedging means in said predetermined direction until the object is subjected to compression of said preset amount.

3. The pressure clamp of claim 2 in which the spacer-expanding-means comprises a spring clutch connected between the drive shaft and the wedging means so as to move the latter in said predetermined direction upon rotation of the shaft from its initial position toward its intermediate position, the clutch being arranged to slip, thereby stopping said movement of the wedging means, whenever said movement is resisted by a magnitude of force equivalent to said preset amount of compression.

4. The pressure clamp of claim 3 in which the connecting means between said shaft and said one part comprises a lost-motion coupling that does not turn said one part so long as the shaft is rotating from its initial position to its intermediate position.

5. The pressure clamp of claim 4 in which:
   (d') the wedging means comprises side-by-side coaxial washers the common axis of which is oriented parallel to the direction of compression, one of said washers being rotatable relative to the other and both of said washers having mutually facing surfaces comprising mating ramps, whereby rotation of said one washer in a predetermined direction will cause the washers to spread apart in the axial direction; and
   (e') the spring clutch is connected between the drive shaft and said one washer to rotate said one washer in said predetermined direction upon rotation of said shaft from its initial position toward its intermediate position until said washer rotation is resisted by a magnitude of torque equivalent to said preset amount of compression.

6. Means for clamping a blade-like contact between a pair of jaw-like contacts comprising:
   (a) a nut and a mating bolt having a head, the nut and the bolt head being adapted respectively to bear against opposite sides of the jaw-like contacts;
   (b) a rotatable actuating member having a predetermined initial angular position;
   (c) lost-motion connecting means between said actuating member and said bolt for screwing said bolt into said nut and thereby compressing the interposed contacts in response to rotation of said member beyond a predetermined second angular position spaced from said initial position by a predetermined angle;
   (d) an expandable spacer located between the head of said bolt and the adjacent contact; and
   (e) means responsive to rotation of said actuating member through said predetermined angle for expanding said spacer until the contacts are subjected to a preset compression of predetermined magnitude.

7. The clamping means of claim 6 in which: the spacer comprises wedging means having a predetermined normal position, the wedging means being movable from its normal position in a predetermined direction to increase the compression of the contacts; and the spacer-expanding means comprises a spring clutch connected between the actuating member and the wedging means so as to move the latter in said predetermined direction during rotation of said member through said predetermined angle, the clutch arranged to slip whenever said movement of the wedging means is resisted by a magnitude of force equivalent to the predetermined magnitude of said preset compression, and the clutch further arranged to return the wedging means to its normal position in response to said member returned to its initial angular position.

8. Means for clamping a blade-like contact between a pair of jaw-like contacts comprising:
   (a) a movable actuating member having a predetermined initial position;
   (b) first means responsive to movement of the actuating member from its first position toward a predetermined second position for compressing the interposed contacts until they are subjected to a preset compression of predetermined magnitude; and
   (c) second means responsive to continued movement of the actuating member beyond its second position for positively effecting additional compression of said contacts.

9. The clamping means of claim 8 in which the first means is coupled to the actuating member by a clutch that slips when said preset contact compression has been attained.

10. The clamping means of claim 8 in which the second means is connected to the actuating member by a lost-motion coupling that prevents effective actuation thereof before the actuating member has reached its second position.

References Cited by the Applicant

UNITED STATES PATENTS 528,900 11/1894 Bolles.
2,363,287 11/1944 Bayer.
2,482,305 9/1949 Volgovskoy et al.

ROBERT K. SCHAEFFER, *Primary Examiner.*

H. O. JONES, *Assistant Examiner.*